United States Patent [19]

Lu

[11] 3,955,778

[45] May 11, 1976

[54] TAPE CASSETTE

[76] Inventor: Shui Ting Lu, No. 28-3, Hsin Sheng South Road, Sec. 3, Taipei, China

[22] Filed: June 24, 1974

[21] Appl. No.: 482,135

[52] U.S. Cl. ............................. 242/194; 352/156
[51] Int. Cl.[2] .................... G03B 1/04; G11B 15/32
[58] Field of Search ......................... 242/193–200; 352/72, 78 R, 156

[56] References Cited
UNITED STATES PATENTS

| | | | |
|---|---|---|---|
| 3,484,056 | 12/1969 | Sugino et al. | 242/193 |
| 3,552,685 | 1/1971 | Larsen | 242/194 |
| 3,639,697 | 2/1972 | Koguma | 242/194 X |

*Primary Examiner*—Leonard D. Christian
*Attorney, Agent, or Firm*—Strauch, Nolan, Neale, Nies & Kurz

[57] ABSTRACT

A cassette tape comprising a case body having an upper cassette half and a lower cassette half with a partition member in-between; a flange ring projecting upward and downward being provided in the center of said partition member to constitute a hub tube for supporting the upper-layer and lower-layer tape hubs in conjunction with corresponding flange rings formed on the upper and lower cassette halves respectively; a plurality of tape guide rollers being provided inside the cassette so as to position the tape separately into two overlapped upper and lower layers in a cassette with a partition member between them, making the cassette capacity to be cut down to one half, while the tape capacity of conventional cassette is still maintained.

8 Claims, 11 Drawing Figures

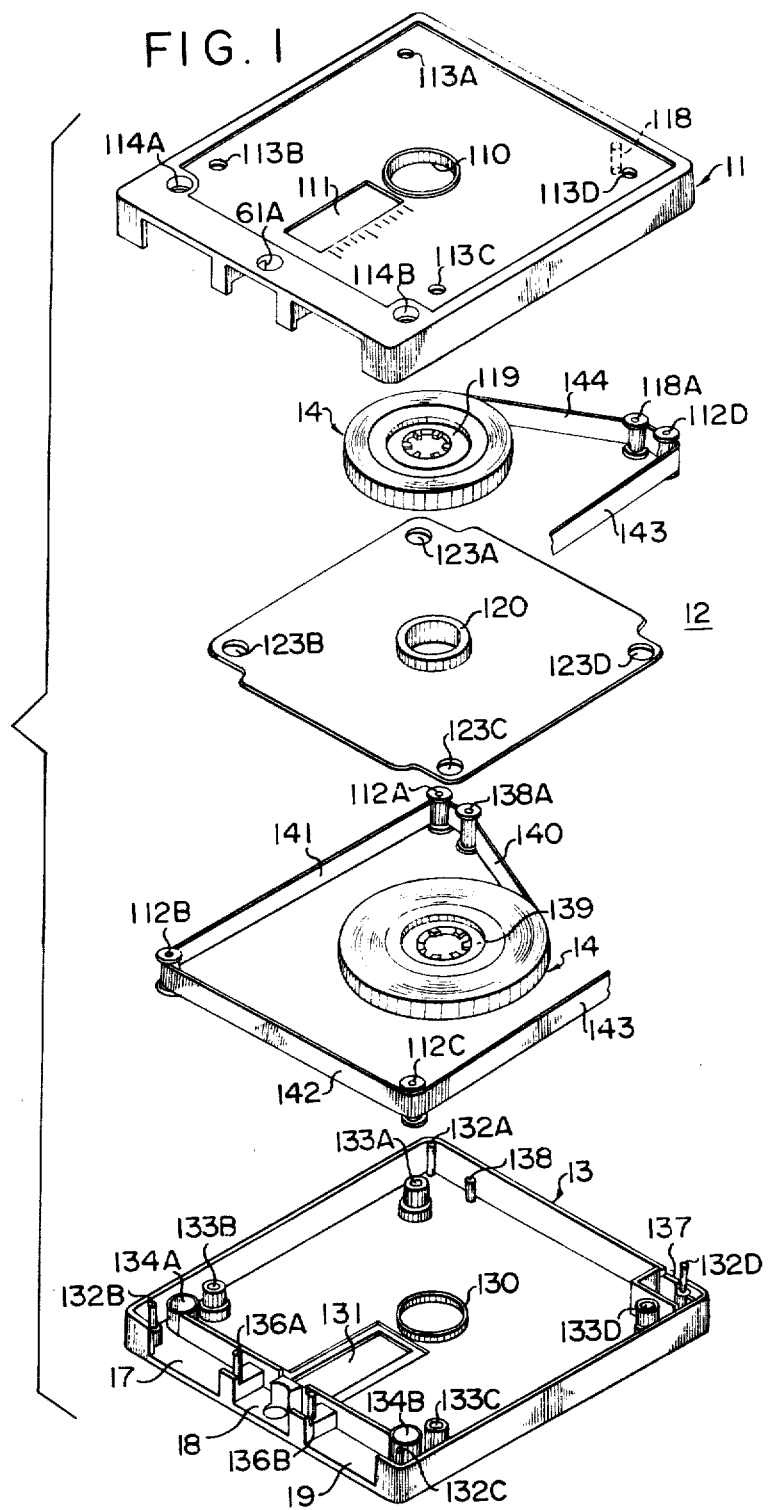

TAPE CASSETTE

BACKGROUND OF THE INVENTION

The present invention relates to a cassette tape, particularly to a double-deck cassette tape capable of reducing by half the conventional size of cassettes without altering the tape capacity and its revolving speed, and minimizing the distortion by a large extent resulting from the wow-flutter occurrence, also suitable for long-play of cassette tape.

The advantages of a cassette recorder are well-known to anybody. The super-small recorders with high recording efficiency and of easier carriage are what we are seeking at this moment. However, it appears to be impossible to minimize the size of a recorder, unless the capacity of the conventional compact cassette is changed. As a matter of fact, there have been several kinds of cassette recorders available on the market with the capacity of tape cassette reduced without changing the driving means, such as the "Philips pocket memo 85" used as dictation machine. But, as the size of the cassette is reduced, the time the tape plays is usually shortened by too large an extent; as a result, its revolving speed must be cut down. Thus, the tone quality of this modified tape cannot be compared to the conventional tapes, and the time of play is too short to obtain a satisfactory result.

Besides, in order to improve the tone quality of recording and playback, different means have been used in the prior art to enable the section of tape to be in good contact with the recording and erasing heads to stabilize the movement of the tape and prevent the disturbance from external vibrations, for example, the Dual Capstan Closed Loop System, employed by Sony, Ampex. However, it is expensive and complicated and, therefore, is not in popular use.

SUMMARY OF THE INVENTION

The primary object of the present invention is to improve disadvantages of cassette tape of the prior art.

Another object of the present invention is to provide a cassette whose volume is cut down to one half of conventional size without altering its tape capacity and revolving speed.

A further object of the present invention is to provide a cassette with double-layer tape hub driven by coaxial rotating shafts to thereby stabilize movements of the hub and the tape, which is very helpful for long operation of thin tape because the double-drive spindle is on the same axle to rotate the take-up reel and supply reel in the same direction.

An additional object of the present invention is to provide a cassette of high-quality tone, in which, a capstan shaft and pinch roller are arranged in front of recording head so that wow-flutter occurrence resulting from the vibrations coming from the supply reel in front of the recording & playback head is cut off, and a plurality of tape guide rollers are employed to successively lessen the vibrations coming from the take-up reel behind the recording & playback head, making the take-up reel speed slightly higher than the tape speed given by the capstan shaft and keeping this section of tape in contact with the recording head tightly to effect a good head touch, thus, without the need of employing the dual capstan closed loop system the present invention can minimize wow-flutter occurrence.

The above-mentioned and other objects and features of the present invention are described hereinafter in conjunction with the appended drawings in which:

FIG. 1 is an exploded view in perspective of a cassette in accordance with the present invention;

Figures 4, 5:
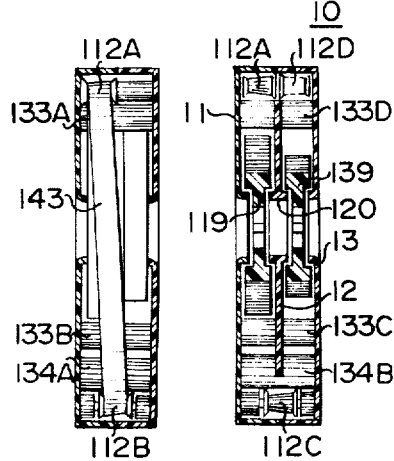
FIG. 4 is a side cross-sectional view along line 4—4 in FIG. 2 showing the positions of supply and take-up reels.
FIG. 5 is a side cross-section view along line 5—5 in FIG. 2 showing that the tape is inclined to one direction.
Figure 2:
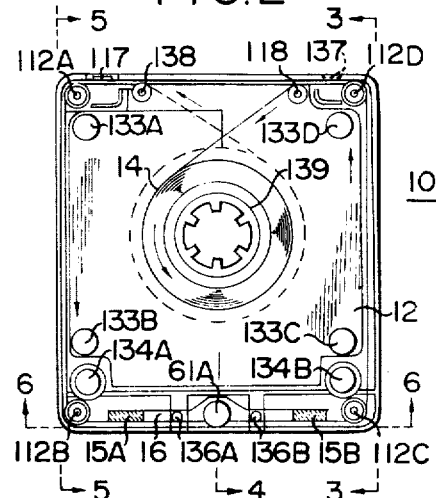
FIG. 2 is a top view of a cassette of the present invention, for purpose of clarity, removing the top layer from upper cassette half so that details of inside upper cassette half can be clearly seen.
Figure 3:
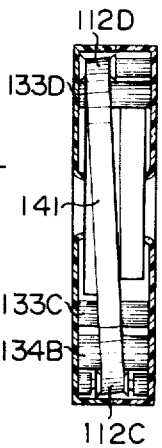
FIG. 3 is a side cross-sectional view along line 3—3 in FIG. 2 showing that the tape is inclined to one direction.
Figure 6:
FIG. 6 is a front cross-section view along line 6—6 in FIG. 2.
Figure 7:
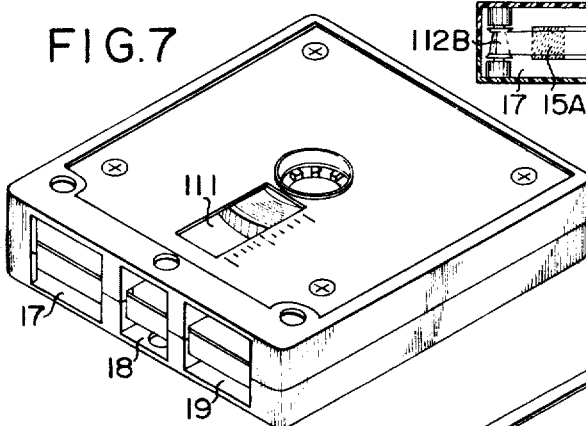
FIG. 7 is a front perspective view of a cassette in accordance with the present invention.
Figure 8:
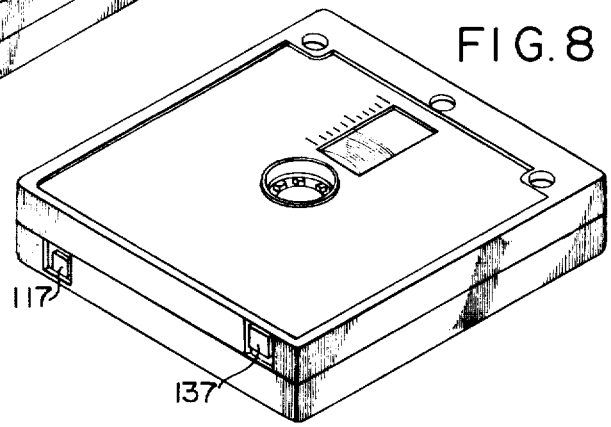
FIG. 8 is a rear perspective view of FIG. 7.

As shown in FIGS. 1–8, the cassette tape 10 of the present invention comprises an upper cassette half 11, a lower cassette half 13, a partition member 12, an upper reel hub 119, a lower reel hub 139, a tape 14, a plurality of tapered tape guide rollers 112A–D, a plurality of tape-inclining and adjusting guide rollers 118A, 138A, guide pins 136A, 136B, spring strip 16 for pressing the tape (FIG. 2), felt blocks 15A, 15B, tape capstan hole 61A, cassette holding holes 134A, 134B, erasure preventing safety tabs 137, 117 and window 111.

In FIG. 1 formation of a hub tube to support the upper and lower hubs are shown. This hub tube comprises flange rings 110 and 130 respectively at the centers of upper and lower halves 11 and 13, and the flange ring 120, that extends both upward and downward vertically to corresponding centers of the partition member 12.

Projecting pins 132A–D are provided respectively right at the four corners of the lower cassette half and their corresponding corners of the upper cassette half for insertion of the projecting pins 132A–D so as to support pivotedly the tapered guide rollers 112A–112D upon the joining together of the upper and lower cassette halves.

In order to lead and guide the tape smoothly from the lower tape hub 139 to upper tape hubs 119, or vise-versa, prior to taking up the tape, the inclination of tape is oriented and corrected by guide rollers 118A, 138A, supported by projecting pins 118, 138. For tape-slope orientation, said rollers 118A and 138A really play an important role in this invention. Because four guide rollers 112A–D lead the tape winding in such a way that they provide the inclination of sections 141, 143 to enable tape to wind from lower cassette half to upper cassette half and vise-versa. Rollers 118A and 138A correct the tape before it is wound on or released from the hubs. Thus rollers 118A and 138A prevent the tape from being wound in a zigzag manner or in other irregular manners. In addition these two guide rollers function as a buffer in regulating the tape speed.

Guide pins 136A, 136B are provided between the front pair of tapered guide rollers 112B, 112C adjacent to both sides of inlet and outlet of the pinch roller. Further, four fixing posts 133A-D, each with screw holes for securing both the upper and lower cassette halves, are provided respectively adjacent to the inner side in respect of said four pins 132A-D; said posts 133A-D corresponding to the fixing holes 123A-D on the partition member 12 to combine the upper and lower cassette halves and eliminate need of any fasteners (see FIG. 4). Thus, the upper and lower cassette halves are joined together, the tape section 140 of the tape 14, wound on the tape hub 139 in the lower cassette half (see FIG. 1) moves in an inclined manner at the tape section 141 through the tape guide roller 138A and the tapered guide 112A onto the tapered guide roller 112B (see FIGS. 1 and 5), and it passes again in a horizontal manner at the tape section 142 through tape guide pins 136A, 136B onto the tapered guide roller 112C (see FIGS. 1 and 2), and again at section 143 the tape moves in an inclined manner through the tapered guide roller 112D and the guide roller 118A onto the tape hub 119 of the upper cassette half to complete a whole winding and taking-up process (see FIGS. 1 and 2). Hence, the cassette tape according to the present invention can position the tape in the space between the two overlapped layers, reducing the space occupied by said tape to only one half of that of the conventional tape without causing any changes to capacity and speed.

Figure 9:
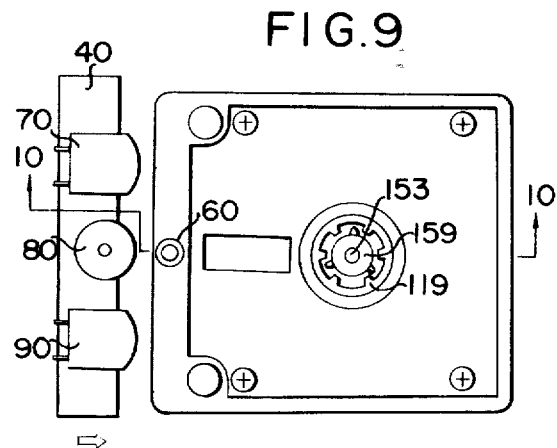
FIG. 9 is a plane view showing the related position of a cassette according to the present invention with its pinch roller, recording head and erasing heads.

As for safety tabs 117, 137, press spring 16, felt blocks 15A, 15B, cassette holding holes 134A, 134B, capstan hole 61A, windows 111, 131, inlet and outlet for erasing head, pinch roller, recording head 17, 18, 19 (see FIGS. 2 and 7) and erasing and recording heads 70, 90, pinch roller 80 together with slide assembly 40 of pinch roller as shown in FIG. 9, they are similar to those of the conventional art and therefore, their relevant descriptions are omitted.

Figure 10:
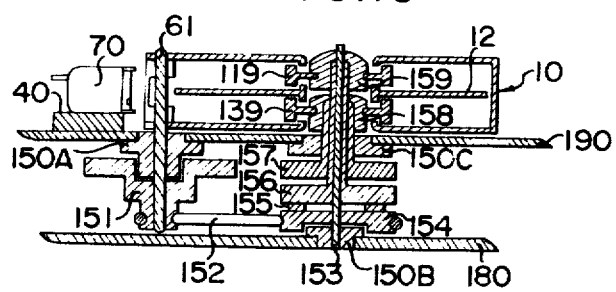
FIG. 10 is a front cross-sectional view along line 10—10 in FIG. 9 showing the drive mechanism of a tape cassette in accordance with the present invention.
Figure 11:
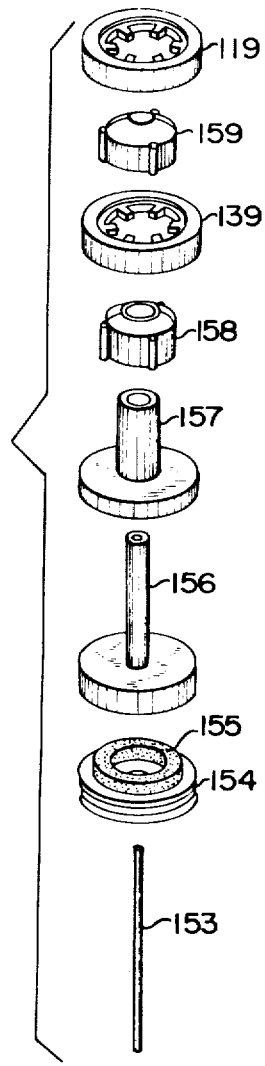
FIG. 11 is an exploded view in perspective of the hub, spindles, inner shaft, outer shaft and felt transmission wheel as shown in FIG. 10.

The drive means of the cassette tape according to the present invention is different from the conventional ones. As shown in FIGS. 10 and 11, the capstan shaft 61 is supported by bearing 150A fixed at the upper chassis 190, and is driven by a motor-driven flywheel 151 (the motor not shown). Said flywheel 151 drives by means of a belt 152 a transmission wheel 154, having a friction felt wheel 155 on top of it; said transmission wheel 154 being supported by a center rod 153; said center rod 153 is secured by boss 150B fixed at the lower chassis 180, said transmission wheel 154 engaged with inner shaft with takeup reel table 156 by means of the friction felt wheel 155 to accomplish the rotational operation, making the take-up reel spindle 159 fixed on it to rotate the upper reel hub 119. Outer shaft with supply reel table 157 is engaged with the inner shaft 156 in a relationship of a loose friction, thus when the inner shaft 156 rotates, the outer shaft 157 will rotate as well; in addition, as both rotations under a double drive shaft are in the a same direction lowering the rotational load, it is very useful to the driving operation of the cassette tape with a two-layer overlapped according to the present invention. Especially, for a long-play operation tape, the low-fidelity defect, caused by the revolving speed differential of tape resulting from displacement of tape load between the supply reel and the take-up reel, can be reduced to a minimum. Hence, when the inner shaft rotates, the outer shaft in turn rotates in the same direction; this will facilitate considerably the revolving load on the inner shaft (or the outer shaft), allowing the tape load applied thereon not to cause variation of the revolving speed and impair the recording and play-back performance. In similarity, when the tape is re-wound, it will have the same effect. This is also deemed to be one of the features of the present invention.

I claim:

1. A cassette comprising upper and lower casing parts adapted to be secured together to provide an internal space, means mounting a fixed partition within said space for defining separate upper and lower chambers, means rotatably mounting a reel within each chamber, said reels being coaxial, means for transporting and guiding a web from one of said reels within the cassette through a station at one edge of the casing where the web is exposed to external web utilization means and back within the cassette to the other reel comprising a series of inclined surface rollers within said space, means at said station for orienting the web with respect to said utilization means, and at least one cylindrical roller parallel to the reel axis disposed adjacent each reel and located between said each reel and an inclined roller for directing the web tangentially to or from the reel, said partition having dimensions which are generally coextensive with the length and breadth of said cassette except at said station and said partition further being spaced at its edges from said casing parts to permit travel of said web from one chamber to the other, and means providing an opening in at least one of said casing parts for admitting drive means for said reels.

2. In the cassette defined in claim 1, said means for rotatably mounting the reels comprising coaxial flange rings on said partition and casing parts.

3. In the cassette defined in claim 1, said cassette being generally rectangular and said inclined surface rollers being disposed at the corners thereof.

4. In the cassette defined in claim 1, at least one of said casing parts having a plurality of internal partition supporting posts projecting through openings in said partition and secured to the other casing part.

5. In the cassette defined in claim 1, said reels being of identical constructions.

6. A cassette comprising upper and lower casing parts and a partition member fixed between the casing parts to define separate upper and lower chambers, coaxial identical reels in each chamber, means rotatably mounting a said reel in each chamber comprising coaxial flange rings on said casing parts and partition member, a plurality of guide rollers within the cassette for transporting and guiding a web from one of said reels to the other and drive means for said reels comprising coaxial inner and outer drive shafts each having a spindle interfittable with said reels, the external configurations of said spindles being essentially identical whereby either of said reels may selectively serve as a supply reel or a take-up reel by reversing the orientation of said cassette on said drive means.

7. In the cassette defined in claim 6, web utilization station means being defined at one edge of the casing, said plurality of guide rollers including web inclination correcting rollers whereby said web is properly oriented in predetermined fashion with respect to said web utilization station means.

8. In the cassette defined in claim 6, a plurality of mating, fixing posts being provided internally on each of said casing parts, each post having means defining a central opening therein for receiving connecting means for securing each set of mating posts together.

* * * * *